United States Patent
Ichikawa et al.

(10) Patent No.: US 7,010,420 B2
(45) Date of Patent: Mar. 7, 2006

(54) VIBRATION CONTROLLER FOR ACTIVE VIBRATION INSULATORS AND METHOD FOR CONTROLLING VIBRATIONS FOR THE SAME

(75) Inventors: Hiroyuki Ichikawa, Kani (JP); Atsushi Muramatsu, Komaki (JP); Takayoshi Yasuda, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/086,389

(22) Filed: Mar. 23, 2005

(65) Prior Publication Data

US 2005/0228574 A1 Oct. 13, 2005

(30) Foreign Application Priority Data

Apr. 13, 2004 (JP) .............................. 2004-118278

(51) Int. Cl.
*G05D 19/00* (2006.01)
*G05B 11/36* (2006.01)

(52) U.S. Cl. ....................................... 701/111; 701/115
(58) Field of Classification Search ................ 701/111, 701/102, 115; 73/11.5, 116, 117.3; 180/61.5
See application file for complete search history.

(56) References Cited

U.S. PATENT DOCUMENTS

| | | | |
|---|---|---|---|
| 3,693,402 A | * | 9/1972 | Jones .......................... 73/11.05 |
| 5,735,251 A | | 4/1998 | Hyodo et al. ................ 123/518 |
| 6,943,460 B1 | * | 9/2005 | Wakashiro et al. ......... 180/65.2 |
| 2004/0161119 A1 | * | 8/2004 | Patton ........................ 381/71.2 |

FOREIGN PATENT DOCUMENTS

| | | |
|---|---|---|
| JP | 2-212222 | 8/1990 |
| JP | 7-42785 | 2/1995 |
| JP | 11-22504 | 1/1999 |
| JP | 11-259147 | 9/1999 |
| JP | 11-350998 | 12/1999 |

* cited by examiner

Primary Examiner—Hieu T. Vo
(74) Attorney, Agent, or Firm—Oblon, Spivak, McClelland, Maier & Neustadt, P.C.

(57) ABSTRACT

A vibration controller includes a data map storage, a detector, a determiner, a signal generator, and an actuator. The data map storage stores amplitude and/or phase data with respect to torque values of a vehicle engine as a data map in advance. The detector detects actual torque values of the vehicle engine. The determiner determines one of the amplitude and/or phase data with respect to one of the actual torque values based on the data map. The signal generator generates a control signal based on cyclic pulsating signals emitted from the vehicle engine, and updates the amplitude and/or phase of the control signal based on the one of the determined amplitude and/or phase data. The actuator actuates an electromagnetic actuator of an active vibration insulator based on the updated control signal, whereby inhibiting vibrations of the vehicle engine from transmitting by means of vibrating forces exerted by the electromagnetic actuator.

5 Claims, 2 Drawing Sheets

VIBRATION CONTROLLER FOR ACTIVE VIBRATION INSULATORS AND METHOD FOR CONTROLLING VIBRATIONS FOR THE SAME

BACKGROUND OF THE INVENTION

1. Field of the Invention

The present invention relates to a vibration controller and a vibration control method for active vibration insulators, vibration controller and method which can actively inhibit vibrations of vehicle engines from transmitting.

2. Description of the Related Art

Such vibration controllers for active vibration insulators have been known conventionally. For example, as disclosed in Japanese Unexamined Patent Publication (KOKAI) No. 11-259,147, a conventional vibration controller for active vibration insulators comprises a plurality of data maps, prepared in advance, on amplitude and phase data depending on vehicle driving conditions, selects an appropriate data map from the data maps, retrieves amplitude and phase data from the selected data map, and generates a signal for actuating an actuator for damping vibrations based on the retrieved amplitude and phase data.

Note herein that vehicle engine vibrations depend on the shift positions, for instance, being put in the "Driving" range or in the "Neutral" range. Moreover, vehicle engine vibrations depend on the states of air-conditioners being turned on or off as well. Accordingly, it is required to prepare a data map for each of vehicle driving conditions, such as the shift positions and the states of air-conditioners, for the conventional vibration controller disclosed in the aforementioned Japanese patent publication. Consequently, a lot of labor should be consumed to prepare such data maps.

Moreover, vehicle engine vibrations depend on the types of engines. Therefore, it is required to prepare a data map for each type of engines for the conventional vibration controller disclosed in the aforementioned Japanese patent publication. That is, the conventional vibration controller cannot cope properly with the fluctuations of controlled objects resulting from the differences between individual engines.

In addition, another vibration controllers have been known conventionally. One of such conventional vibration controllers retrieves a pulsating signal, which is for detecting a crankshaft position, from around an output shaft of engines, calculates an estimated value of torque variations from a change of the pulsating signal in a predetermined cycle by an adaptive control method, and generates a signal for actuating an actuator depending on a magnitude of the estimated value. However, the load for processing the computation is very high, because the conventional vibration controller calculates to find the torque vibrations. Accordingly, the conventional vibration controller needs an expensive control device, because it is required to exhibit high computing performance. Consequently, it is difficult to employ the conventional vibration controller for general vehicles, for example, for which it is necessary to remove the vibrations of engines simply and less expensively.

SUMMARY OF THE INVENTION

The present invention has been developed in order to solve the aforementioned problems. It is therefore an object of the present invention to provide a vibration controller for active vibration insulators, and a vibration control method for the same, vibration controller and vibration control method which can damp the vibrations of vehicle engines actively as well as simply and less expensively.

In order to achieve the aforementioned object, a vibration controller for active vibration insulators according to the present invention comprises:

a data map storage for storing a data map prepared in advance, the data map comprising amplitude and/or phase data with respect to torque values of a vehicle engine;

means for detecting actual torque values of the vehicle engine;

means for determining one of the amplitude and/or phase data with respect to one of the actual torque values based on the data map;

a signal generator for generating a control signal based on cyclic pulsating signals emitted from the vehicle engine, the control signal comprising an amplitude and a phase, and updating the amplitude and/or phase of the control signal based on the one of the determined amplitude and/or phase data; and an actuator for actuating an electromagnetic actuator of an active vibration insulator based on the updated control signal, whereby inhibiting vibrations of the vehicle engine from transmitting by means of vibrating forces exerted by the electromagnetic actuator.

In the present vibration controller, the data map stores amplitude and/or phase data with respect to torque values of a vehicle engine. That is, contrary to the conventional vibration controller, the present vibration controller does not require a large number of data maps depending on vehicle driving conditions. The reason will be hereinafter described briefly. Torque values of a vehicle engine correspond to loads to the vehicle engine. For example, when the shift position is changed, or when an air-conditioner is turned on or off, actual torque values of the vehicle engine are turned into torque values which depend on the driving conditions. Therefore, the present vibration controller hardly requires data maps, which depend on the shift positions and the states of the air-conditioner being turned on or off. Moreover, it is unnecessary to prepare data maps for types of vehicle engine, respectively.

As a result, it is possible to prepare the data map, which the present vibration controller uses, readily remarkably and less expensively. Moreover, even when the present vibration controller using such a data map does not exhibit such high computing performance as that of the conventional vibration controllers using adaptive control methods, the present vibration controller can be applied to general vehicles fully. That is, the present vibration controller can remove the vibration of vehicle engines less expensively remarkably.

Note that the present vibration controller can further comprise means for detecting actual vehicle engine revolutions, wherein: the data map can further comprise amplitude and/or phase data with respect to vehicle engine revolutions in addition the torque values of the vehicle engine; and the data determining means can further determine one of the amplitude and/or phase data with respect to one of the actual vehicle engine revolutions in addition to one of the actual torque values based on the data map. When using the data map further comprising the amplitude and/or phase data with respect to the vehicle engine revolutions in addition to the torque values, the present vibration controller can actively inhibit the vibrations of vehicle engines from transmitting more securely and easily.

Moreover, the data map can further comprise amplitude and/or phase data with respect to datum torque values; the data map storage can be capable of selecting a plurality of the datum torque values on the vehicle engine; and the data determining means can be capable of selecting the datum torque values before and after the actual torque values, can be further capable of selecting two of the amplitude and/or phase data with respect to two of the selected datum torque values from the data map, and can further determine one of the amplitude and/or phase data with respect to one of the actual torque values by proportional-distribution interpolation based on two of the selected datum torque values in addition to the two of the determined amplitude and/or phase data.

In the present vibration controller modified as described above, the data map is prepared by further finding amplitude and/or phase data with respect to a small number of datum torque values in a range of controlled frequencies. Moreover, the present vibration controller carries out proportional-distribution interpolation based on the data map, which further comprises the amplitude and/or phase data with respect to the datum torque values, and thereby determines one of the amplitude and/or phase data based on one of the amplitude and/or phase data with respect to one of detected actual torque values. The present vibration controller thus carries out proportional-distribution interpolation to find the amplitude and/or phase data, and can thereby produce the amplitude and/or phase data with high accuracy. The present vibration controller updates the amplitude and/or phase of the control signal based on the amplitude and/or phase data with high accuracy, and thereby readily produces appropriate control signals corresponding to the actual torque values.

The present vibration controller actuates the electromagnetic actuator of the active vibration insulator based on the updated control signals. As a result, the present vibration controller can inhibit the vibrations of the vehicle engine from transmitting by means of vibrating forces exerted by the electromagnetic actuator, irrespective of vehicle driving conditions as well as irrespective of the fluctuation of individual engines. Moreover, the present vibration controller can find amplitude and/or phase data with respect to actual torque values by proportion distribution using the data map which has been prepared readily. Accordingly, the computing cost is less expensive. Consequently, the present vibration controller can be applied to general vehicles for which it is necessary to remove the vibrations of engines simply and less expensively.

Moreover, the data map can further comprise amplitude and/or phase data with respect to datum torque values; the data map storage can be capable of selecting a plurality of the datum torque values on the vehicle engine; and the data determining means can be capable of selecting the datum torque values around the actual torque values, and can further determine one of the amplitude and/or phase data with respect to one of the datum torque values based on the data map.

In the present vibration controller modified as described above, the data map is prepared by finding amplitude and/or phase data with respect to a small number of datum torque values in a range of controlled frequencies. Moreover, the present vibration controller selects one of the datum torque values around one of detected actual torque values, and thereby determines one of the amplitude and/or phase data corresponding to one of the selected datum torque values. The present vibration controller thus finds the amplitude and/or phase data with respect to the datum torque values around the actual torque values, and can thereby produce the amplitude and/or phase data readily remarkably. As a result, not only the present vibration controller can securely inhibit the vibrations of the vehicle engine from transmitting, but also it can be applied to general vehicles for which it is necessary to remove the vibrations of engines simply and less expensively.

In addition, a method according to the present invention for controlling vibrations of active vibration insulators comprises the steps of:

storing amplitude and/or phase data with respect to torque values of a vehicle engine as a data map in advance;

detecting actual torque values of the vehicle engine;

determining one of the amplitude and/or phase data with respect to one of the actual torque values based on the data map;

generating a control signal based on cyclic pulsating signals emitted from the vehicle engine, the control signal comprising an amplitude and a phase, and updating the amplitude and/or phase of the control signal based on the one of the determined amplitude and/or phase data; and actuating an electromagnetic actuator of an active vibration insulator based on the updated control signal, thereby inhibiting vibrations of the vehicle engine from transmitting by means of vibrating forces exerted by the electromagnetic actuator.

In the present vibration control method, the data map stores amplitude and/or phase data with respect to torque values of a vehicle engine. That is, contrary to the conventional vibration method, the present vibration control method does not require a large number of data maps depending on vehicle driving conditions. Therefore, the present vibration control method hardly requires data maps, which depend on the shift positions and the states of the air-conditioner being turned on or off. Moreover, it is unnecessary to prepare data maps for types of vehicle engine, respectively.

As a result, it is possible to prepare the data map, which the present control method uses, readily remarkably and less expensively. Moreover, even when the present vibration control method using such a data map does not exhibit such high computing performance as that of the conventional vibration control method using adaptive control methods, the present vibration control method can be applied to general vehicles fully. That is, the present vibration control method can remove the vibration of vehicle engines less expensively remarkably.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to a specific example of the present invention using accompanied drawings.

EXAMPLE

Figure 1:
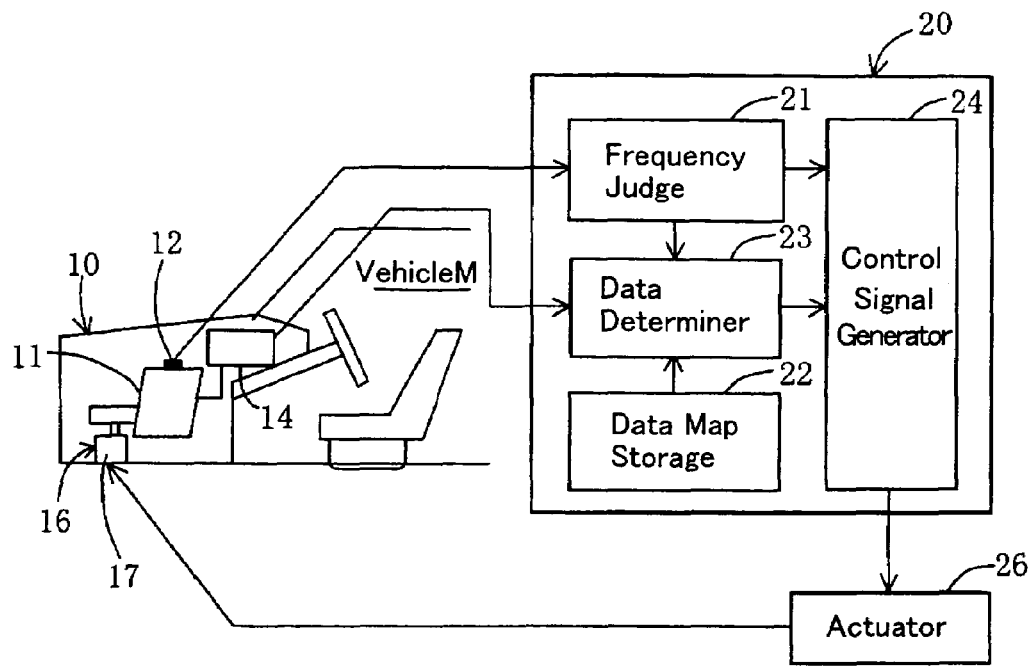
FIG. 1 is a schematic diagram for roughly illustrating an arrangement of a vibration controller according to an example of the present invention for inhibiting an engine of a vehicle M from vibrating.

FIG. 1 roughly illustrates an arrangement of a vibration controller according to an example of the present invention by means of a schematic diagram, vibration controller which is for inhibiting vibrations of a vehicle M's engine from transmitting. As illustrated in the drawing, the vibration controller comprises an engine mount 16, which is provided with an actuator, an active vibration insulator, (hereinafter simply referred to as an "engine mount"), a rotary pulse sensor 12, and an engine controller unit 14, a controller unit 20, and an actuator 26. The vehicle M comprises a vehicle body 10 which is equipped with the engine mount 16. The engine mount 16 supports an engine 11, a vibration generating source. The controller unit 20 generates control signals. The actuator 26 actuates the actuator of the engine mount 16 based on the control signals.

The engine mount 16 comprises a cylinder-shaped housing (not shown), a vibration insulator rubber (not shown) disposed in the cylinder-shaped housing, and an electromagnetic actuator 17 disposed in the cylinder-shaped housing. The electromagnetic actuator 17 can be a solenoid or an electromagnet, for instance, and controls the dynamic displacements of the engine 11 by the displacements of the vibration insulator rubber. The engine mount 16 is fastened to the vehicle body 10 at the lower fastening shaft (not shown), and is installed to the engine 11 at the upper fastening shaft (not shown), thereby supporting the engine 11.

The rotary pulse sensor 12 is disposed adjacent to the crankshaft of the engine 11. The rotary pulse sensor 12 detects engine revolutions, and outputs rotary pulsating signals of the crankshaft to the controller unit 20. Note that the controller unit 20, described later, determines a basic frequency of input signals based on the rotary pulsating signals.

The engine controller unit 14 controls the operations of the engine 11. The engine controller unit 14 computes an actual torque value $tq_r$ of the engine 11, and outputs the resulting actual torque value $tq_r$ to the controller unit 20.

The controller unit 20 comprises a frequency judge 21, a data map storage 22, a data determiner 23, and a control signal generator 24. The frequency judge 21 receives rotary pulsating signals emitted from the rotary pulse sensor 12, and judges whether the received rotary pulsating signals are a controlled frequency $F_r$ or not. Moreover, the frequency judge 21 selects a control signal with respect to the controlled frequency $F_r$, and outputs the selected control signal to the data determiner 23 and control signal generator 24. The data map storage 22 stores amplitude and phase data as a data map. The amplitude and phase data are prepared in advance in the following manner. A plurality of datum torque values $tq_{s0}$, $tq_{s1}$, $tq_{s2}$, $tq_{s3}$ and $tq_{s4}$ are selected. Thus, the number of datum torque values is set at 5 in the present example. Note that $tq_{s0} < tq_{s1} < tq_{s2} < tq_{s3} < tq_{s4}$. Then, the amplitude and phase data are prepared with respect to the controlled frequency $F_r$ which corresponds to every revolution of the engine 11 at each of the datum torque values $tq_{s0}$ through $tq_{s4}$. Moreover, in the present example, $tq_{s0} = 0\%$ and $tq_{s4} = 100\%$. In addition, the controlled frequency $F_r$ falls in a range of from 20 to 121 Hz.

As shown in Table 1 below, the data map of the data map storage 22 comprises an amplitude map and a phase map. The amplitude and phase maps comprise amplitude and phase data which are found on the five datum torque values, $tq_{s0}$, $tq_{s1}$, $tq_{s2}$, $tq_{s3}$ and $tq_{s4}$, for every 1 Hz in a frequency range of from 20 to 121 Hz, respectively. Note that, in the present example, for an amplitude $a_r$, $(Map \cdot a_0)f = 0\%$ at an actual torque $tq_r = tq_{s0}$. Moreover, a phase $\phi_r$ does not vary in a range of the actual torque $tq_r =$ from $tq_{s0}$ to $tq_{s4}$, and accordingly is a constant value, $(Map \cdot \phi_0)f = (Map \cdot \phi_1)f$.

TABLE 1

| Datum Torque Value (%) | Frequency $F_r$ (Hz) | | | | |
|---|---|---|---|---|---|
| | 20 | 21 | ... | 120 | 121 |
| (Amplitude Map) | | | | | |
| $tq_{s0} = 0$ | 0 | 0 | ... | 0 | 0 |
| $tq_{s1}$ | $(Map \cdot a_1)_{20}$ | $(Map \cdot a_1)_{21}$ | ... | $(Map \cdot a_1)_{120}$ | $(Map \cdot a_1)_{121}$ |
| $tq_{s2}$ | $(Map \cdot a_2)_{20}$ | $(Map \cdot a_2)_{21}$ | ... | $(Map \cdot a_2)_{120}$ | $(Map \cdot a_2)_{121}$ |
| $tq_{s3}$ | $(Map \cdot a_3)_{20}$ | $(Map \cdot a_3)_{21}$ | ... | $(Map \cdot a_3)_{120}$ | $(Map \cdot a_3)_{121}$ |
| $tq_{s4} = 100$ | $(Map \cdot a_4)_{20}$ | $(Map \cdot a_4)_{21}$ | ... | $(Map \cdot a_4)_{120}$ | $(Map \cdot a_4)_{121}$ |
| (Phase Map) | | | | | |
| $tq_{s0} = 0$ | $(Map \cdot \phi_0)_{20}$ | $(Map \cdot \phi_0)_{21}$ | ... | $(Map \cdot \phi_0)_{120}$ | $(Map \cdot \phi_0)_{121}$ |
| $tq_{s1}$ | $(Map \cdot \phi_1)_{20}$ | $(Map \cdot \phi_1)_{21}$ | ... | $(Map \cdot \phi_1)_{120}$ | $(Map \cdot \phi_1)_{121}$ |
| $tq_{s2}$ | $(Map \cdot \phi_2)_{20}$ | $(Map \cdot \phi_2)_{21}$ | ... | $(Map \cdot \phi_2)_{120}$ | $(Map \cdot \phi_2)_{121}$ |
| $tq_{s3}$ | $(Map \cdot \phi_3)_{20}$ | $(Map \cdot \phi_3)_{21}$ | ... | $(Map \cdot \phi_3)_{120}$ | $(Map \cdot \phi_3)_{121}$ |
| $tq_{s4} = 100$ | $(Map \cdot \phi_4)_{20}$ | $(Map \cdot \phi_4)_{21}$ | ... | $(Map \cdot \phi_4)_{120}$ | $(Map \cdot \phi_4)_{121}$ |

Figure 2:
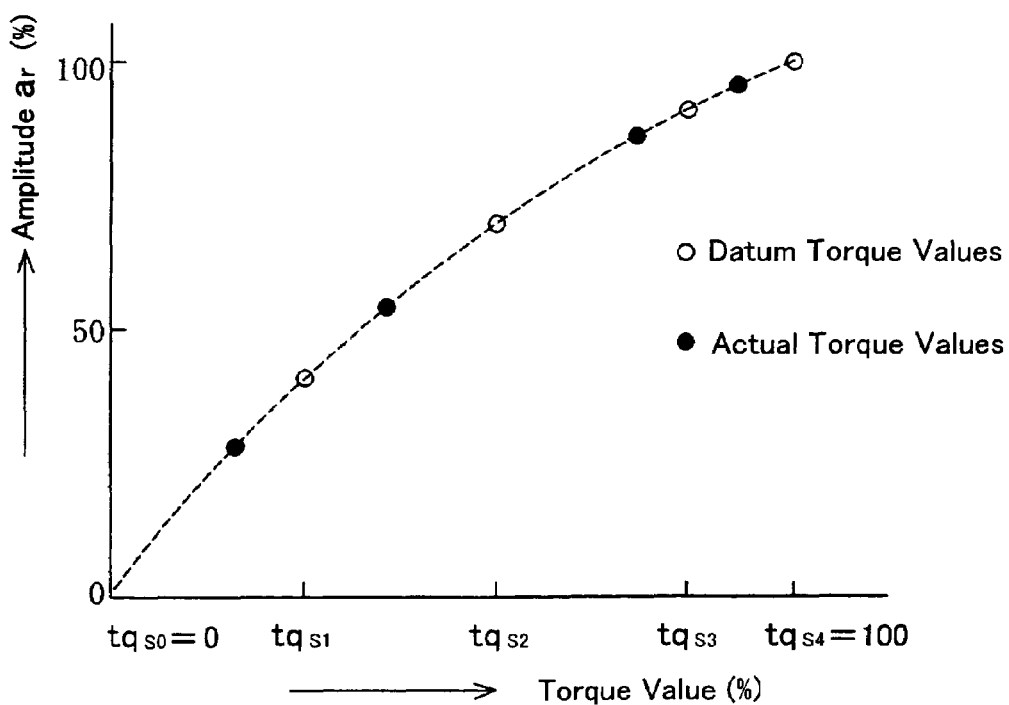
FIG. 2 is a graph for illustrating a relationship between the torque values of engine and the amplitudes of control signal, relationship which was exhibited by the vibration controller according to the example of the present invention.
Figure 3:
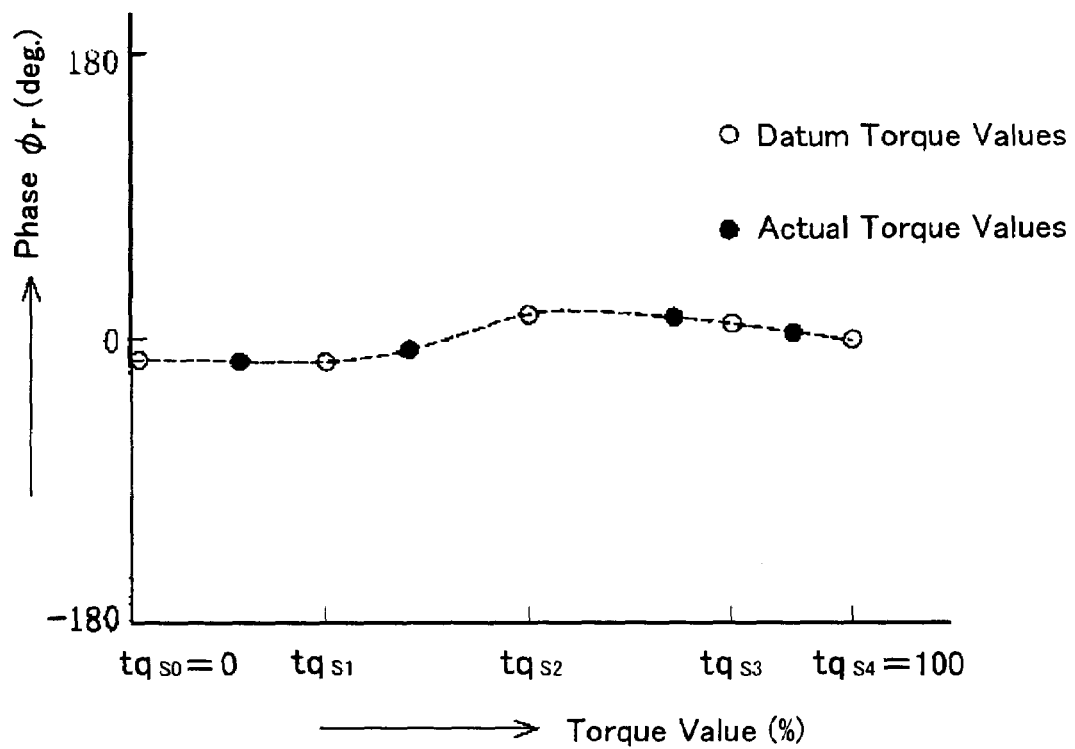
FIG. 3 is a graph for illustrating a relationship between the torque values of engine and the phases of control signal, relationship which was exhibited by the vibration controller according to the example of the present invention.

The data determiner 23 receives an actual torque value $tq_r$ output from the engine controller unit 14 and the controlled frequency $F_r$ output from the frequency judge 21, and selects one of the amplitude and phase data based on the received actual torque value $tq_r$ and controlled frequency $F_r$. Then, the data determiner 23 calculates an amplitude value $a_r$ and a phase value $\phi_r$, which correspond to the input actual torque value $tq_r$, in accordance with latter described equations (1) through (4). More specifically, the calculated amplitude value $a_r$ and phase value $\phi_r$ are found with respect to the actual torque value $tq_r$ of the engine 11 by proportional-distribution interpolation. Note that the amplitude value $a_r$ and phase value $\phi_r$ are based on the datum torque values $tq_{s0}$ through $tq_{s4}$ before and after the actual torque value $tq_r$ as well as the amplitude map data (Map·$a_r$)f and phase map data (Map·$\phi_r$)f, which correspond to the datum torque values $tq_{s0}$ through $tq_{s4}$ and are selected from the data map. For example, FIG. 2 illustrates the relationship between the torque values of the engine 11 and the amplitude value $a_r$, which is plotted to the respective datum torque values $tq_{s0}$, $tq_{s1}$, $tq_{s2}$, $tq_{s3}$ and $tq_{s4}$, for a specific controlled frequency $F_r$. FIG. 3 illustrates the relationship between the torque values of the engine 11 and the phase value $\phi_r$, which is plotted to the respective datum torque values $tq_{s0}$, $tq_{s1}$, $tq_{s2}$, $tq_{s3}$ and $tq_{s4}$, for a specific controlled frequency $F_r$. Note that the vertical axis in FIG. 2 represents the resolution of the controller unit 20. That is, in FIG. 2, the amplitude vale $a_r=100\%$ is equivalent to the maximum resolution of controller unit 20. Moreover, in the drawings, the blank circles (○) correspond to the five datum torque values, $tq_{s0}$, $tq_{s1}$, $tq_{s2}$, $tq_{s3}$ and $tq_{s4}$, and the solid circles (●) correspond to arbitrary actual torque value.

In the present example, the five datum torque values, $tq_{s0}$, $tq_{s1}$, $tq_{s2}$, $tq_{s3}$ and $tq_{s4}$, are used. Accordingly, the following four computing equations, equations (1), (2), (3) and (4), are defined for four ranges, $tq_{s0}$ (or 0)$\leq tq_r \leq tq_{s1}$, $tq_{s1} < tq_r \leq tq_{s2}$, $tq_{s2} < tq_r \leq tq_{s3}$ and $tq_{s3} < tq_r \leq tq_{s4}$ (or 100). Note that the subscript "f" in the equations designates a frequency.

Equation (1):

when $tq_{s0}$ (or 0) $\leq tq_r \leq tq_{s1}$, $a_r = (Map \cdot a_1)_f \times tq_r / tq_{s1}$; and $\phi_r = (Map \cdot \phi_1)_f$ Equation (2):

when $tq_{s1} > tq_r \leq tq_{s2}$, $a_r = (Map \cdot a_1)_f$ $+ (tq_r - tq_{s1}) \times \{(Map \cdot a_2)_f$ $- (Map \cdot a_1)_f\} / (tq_{s2}$ $- tq_{s1})$ Equation (3):

when $tq_{s2} > tq_r \leq tq_{s3}$, $a_r = (Map \cdot \phi_2)_f$ $+ (tq_r - tq_{s2}) \times \{(Map \cdot a_3)_f$ $- (Map \cdot a_2)_r\} / (tq_{s3} - tq_{s2})$ Equation (4):

when $tq_{s3} > tq_r \leq tq_{s4}$ (or 100), $a_4 = (Map \cdot a_3)_f$ $+ (tq_r - tq_{s3}) \times \{(Map \cdot a_4)_f$ $- (Map \cdot a_3)_f\} / (100 - tq_{s3})$; and $\phi_4 = (Map \cdot \phi_3)_f$ $+ (tq_r - tq_{s3}) \times \{(Map \cdot \phi_4)_f$ $- (Map \cdot \phi_3)_f\} / (100 - tq_{s3})$ The control signal generator 24 updates the amplitude and phase of the control signal, which is output from the frequency judge 21, based on the amplitude value $a_r$ and phase value $\phi_r$, which the data determiner 23 calculates. Then, the control signal generator 24 outputs the updated control signal to an actuator 26 as a control signal. Note that the resultant updated control signal comprises a cyclic signal whose elements are amplitudes and phases. The actuator 26 comprises a pulse-width modulated (hereinafter simply referred to as "PWM") signal generator, and an actuator circuit, for instance. The PWM signal generator outputs PWM signal modulated by PWM which changes the amplitude of sine waves to the pulse width, for example. The actuator circuit comprises a so-called H-bridge circuit. Thus, the actuator 26 generates an actuating signal based on the updated control signal. The actuating signal actuates the electromagnetic actuator 17 of the engine mount 16.

How the vibration controller according to the present example operates will be hereinafter described.

First, the rotary pulse sensor 12 detects a revolution of the engine 11, and outputs a rotary pulsating signal to the frequency judge 21 of the controller unit 20. Moreover, the engine controller unit 14 computes an actual torque value $tq_r$ of the engine 11. In addition, the engine controller unit 14 outputs the actual torque value $tq_r$ of the engine 11 to the data determiner 23. Then, the frequency judge 21 of the controller unit 20 judges whether the frequency of the rotary pulsating signal is the controlled frequency $F_r$ or not. If such is the case, the frequency judge 21 generates a control signal for the controlled frequency $F_r$, and outputs the resulting control signal to the data determiner 23 and the control signal generator 24. The data determiner 23 judges in which one of the ranges of from $tq_{s0}$ to $tq_{s4}$ the actual torque value $tq_r$ falls. Then, the data determiner 23 selects datum torque values before and after the actual torque value $tq_r$. Moreover, the data determiner 23 selects one of above-described equations (1), (2), (3) and (4) in accordance with the selected datum torque values, and selects amplitude map data (Map·$a_r$)f and phase map data (Map·$\phi_r$)f, which correspond to the controlled frequency $F_r$, from the data map storage 22. In addition, the data determiner 23 computes an amplitude value $a_r$ and a phase value $\phi_r$, which correspond to the actual torque value $tq_r$, by proportional-distribution interpolation.

The frequency judges 21 outputs the generated control signal for the controlled frequency $F_r$ to the control signal generator 24. On the other hand, and the data determiner 23 outputs the amplitude value $a_r$ and phase value $\phi_r$, which is computed for the actual torque value $tq_r$, to the control signal generator 24. The control signal generator 24 updates the amplitude value and phase value of the control signal, and outputs the updated control signal to the actuator 26. The actuator 26 generates an actuating signal in accordance with the updated control signal, and outputs the resultant actuating signal to the electromagnetic actuator 17 of the engine mount 16 to actuate the electromagnetic actuator 17. Thus, the electromagnetic actuator 17 exerts vibrating forces to properly inhibit the vibrations of the engine 11 from transmitting.

As described above, the vibration controller according to the present example uses the data map stored in advance and comprising amplitude and phase data for each control signal which corresponds to each revolution of the engine 11 at the five datum torque values, $tq_{s0}$, $tq_{s1}$, $tq_{s2}$, $tq_{s3}$ and $tq_{s4}$, regarding the engine 11. Accordingly, the vibration controller can find an interpolated value, which comprises the amplitude value $a_r$ and phase value $\phi_r$ with respect to the actual torque value $tq_r$, for the actual torque value $tq_r$ of the engine 11 by proportion-distribution interpolation based on the datum torque values before and after the actual torque value $tq_r$ of the engine 11 as well as the amplitude and phase data corresponding to the datum torque values. Note that the data map used herein is prepared readily by finding the amplitude value $a_r$ and phase value $\phi_r$ with respect to the five datum torque values, $tq_{s0}$, $tq_{s1}$, $tq_{s2}$, $tq_{s3}$ and $tq_{s4}$, in the range of the controlled frequency $F_r$. However, it is possible to produce highly accurate interpolated values with respect to the actual torque value $tq_r$ spreading over a wide range by finding interpolated values by means of proportion-distribution interpolation. Consequently, it is possible to produce proper control signals, which correspond to the actual torque value $tq_r$, with ease by updating the amplitude and phase of control signals based on the highly reliable interpolated values.

Thus, the vibration controller according to the present example actuates the electromagnetic actuator 17 of the engine mount 16 based on the proper control signals. Accordingly, the vibration controller can damp the vibrations of the engine 11 by means of the vibrating forces exerted by the electromagnetic actuator 17, irrespective of vehicle driving conditions as well as irrespective of the fluctuation of individual engines. Moreover, the vibration controller can easily find amplitude and/or phase data with respect to actual torque values by proportional-distribution interpolation using the data maps prepared readily. Consequently, the computing cost is less expensive. As a result, it is possible to apply the vibration controller to general vehicles for which it is necessary to remove the vibrations of engines simply and less expensively.

The above-described vibration controller according to the present example uses the amplitude data map and the phase data map as the data map. However, note that the vibration controller can use the amplitude data map alone, depending on specific applications. Moreover, the number and range of the datum torque values are not limited those as set forth in the vibration controller, but can be selected appropriately in compliance with specific controlled objects. In addition, note that the vibration controller is one of the examples of the present invention for active vibration insulators. Accordingly, it is possible to carry out the vibration controller with various modifications within such a range that does not depart from the spirit or scope of the present invention.

Moreover, in the above-described vibration controller according to the present example, the data determiner 23 finds the amplitude value $a_r$ and phase value $\phi_r$ with respect to the actual torque value $tq_r$ by proportional-distribution interpolation. However, not limited to proportional-distribution interpolation, the amplitude value $a_r$ and phase value $\phi_r$ can be found otherwise. For example, the data determiner 23 can determine the amplitude value $a_r$ and phase value $\phi_r$ in the following manner. The data determiner 23 selects one of the datum torque values $tq_{s0}$ through $tq_{s4}$ around the actual torque value $tq_r$ of the engine 11. Then, the data determiner 23 selects one of the amplitude map data (Map·$a_r$)f and phase map data (Map·$\phi_r$)f based on the selected datum torque value as well as the controlled frequency $F_r$. Finally, the data determiner 23 determines the selected amplitude map data (Map·$a_r$)f and phase map data (Map·$\phi_r$)f as the amplitude value $a_r$ and phase value $\phi_r$ of the control signal.

When thus determining the amplitude value $a_r$ and phase value $\phi_r$ of the control signal, the vibration controller according to the present example can determine the amplitude value $a_r$ and phase value $\phi_r$ of the control signal very easily, less expensively and at fast rate.

INDUSTRIAL APPLICABILITY

The present invention uses the amplitude and/or phase data of each control signal for each engine revolution, amplitude and/or phase data which are stored as a data map in advance and are found for a small number of datum torque values regarding engines. Then, the present invention determines the amplitude value and phase value of control signals with respect to actual torque values of engines using such a data map. Accordingly, the present invention can produce proper control signals, which correspond to the actual torque values, readily and less expensively. Consequently, the present invention can damp the vibrations of engines by means of the vibrating forces exerted by electromagnetic actuators, irrespective of vehicle driving conditions as well as irrespective of the fluctuation of individual engines.

Having now fully described the present invention, it will be apparent to one of ordinary skill in the art that many changes and modifications can be made thereto without departing from the spirit or scope of the present invention as set forth herein including the appended claims.

What is claimed is:

1. A vibration controller for active vibration insulators, the vibration controller comprising:
   a data map storage for storing a data map prepared in advance, the data map comprising amplitude and/or phase data with respect to torque values of a vehicle engine;
   means for detecting actual torque values of the vehicle engine;
   means for determining one of the amplitude and/or phase data with respect to one of the actual torque values based on the data map;
   a signal generator for generating a control signal based on cyclic pulsating signals emitted from the vehicle engine, the control signal comprising an amplitude and a phase, and updating the amplitude and/or phase of the control signal based on the one of the determined amplitude and/or phase data; and
   an actuator for actuating an electromagnetic actuator of an active vibration insulator based on the updated control signal, whereby inhibiting vibrations of the vehicle engine from transmitting by means of vibrating forces exerted by the electromagnetic actuator.

2. The vibration controller set forth in claim 1 further comprising means for detecting actual vehicle engine revolutions, wherein:
   the data map further comprises amplitude and/or phase data with respect to vehicle engine revolutions in addition the torque values of the vehicle engine; and
   the data determining means further determines one of the amplitude and/or phase data with respect to one of the actual vehicle engine revolutions in addition to one of the actual torque values based on the data map.

3. The vibration controller set forth in claim 1, wherein:
   the data map further comprises amplitude and/or phase data with respect to datum torque values;
   the data map storage is capable of selecting a plurality of the datum torque values on the vehicle engine; and
   the data determining means is capable of selecting the datum torque values before and after the actual torque values, is further capable of selecting two of the amplitude and/or phase data with respect to two of the selected datum torque values from the data map, and further determines one of the amplitude and/or phase data with respect to one of the actual torque values by proportional-distribution interpolation based on two of the selected datum torque values in addition to the two of the determined amplitude and/or phase data.

4. The vibration controller set forth in claim 1, wherein:
the data map further comprises amplitude and/or phase data with respect to datum torque values;
the data map storage is capable of selecting a plurality of the datum torque values on the vehicle engine; and
the data determining means is capable of selecting the datum torque values around the actual torque values, and further determines one of the amplitude and/or phase data with respect to one of the datum torque values based on the data map.

5. A method for controlling vibrations of active vibration insulators, the method comprising the steps of:
storing amplitude and/or phase data with respect to torque values of a vehicle engine as a data map in advance;
detecting actual torque values of the vehicle engine;
determining one of the amplitude and/or phase data with respect to one of the actual torque values based on the data map;
generating a control signal based on cyclic pulsating signals emitted from the vehicle engine, the control signal comprising an amplitude and a phase, and updating the amplitude and/or phase of the control signal based on the one of the determined amplitude and/or phase data; and
actuating an electromagnetic actuator of an active vibration insulator based on the updated control signal, thereby inhibiting vibrations of the vehicle engine from transmitting by means of vibrating forces exerted by the electromagnetic actuator.

* * * * *